Oct. 27, 1959     E. J. ONDECK     2,910,302
CAM CHUCK
Filed Jan. 30, 1957
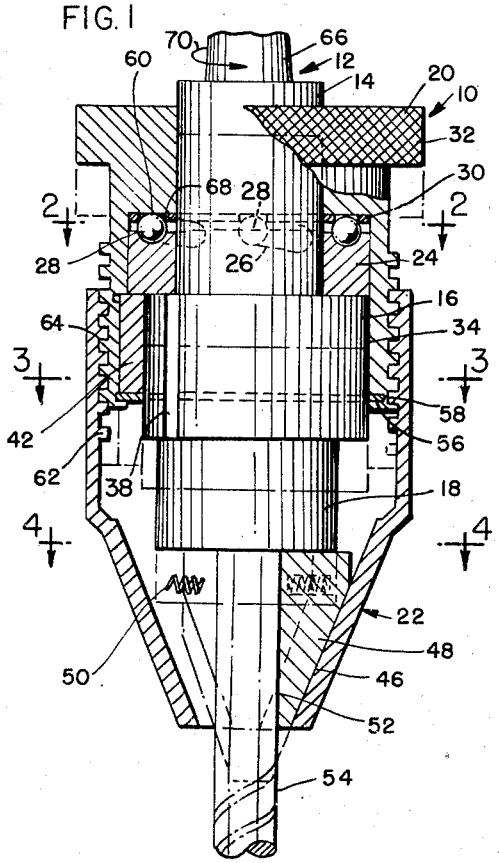
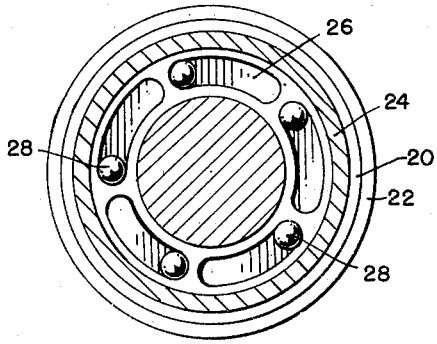
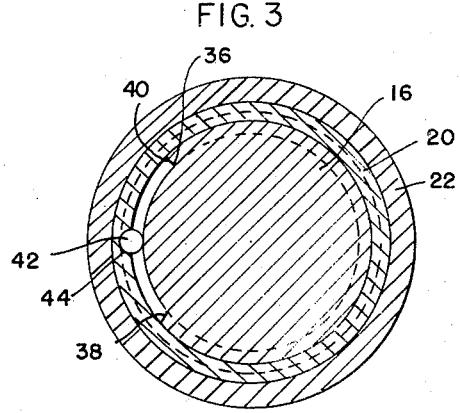
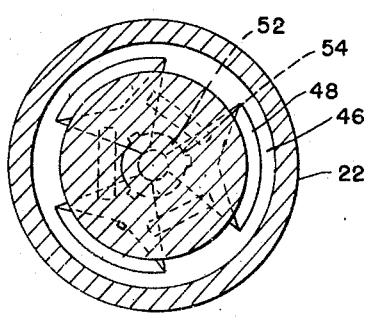
INVENTOR:
ELMER JOHN ONDECK
ATT'Y

United States Patent Office 2,910,302
Patented Oct. 27, 1959

2,910,302

CAM CHUCK

Elmer John Ondeck, Brookfield, Ill., assignor to Supreme Products Corporation, Chicago, Ill., a corporation of Illinois Application January 30, 1957, Serial No. 637,120

7 Claims. (Cl. 279—22)

This invention relates to chucks for drills and the like, and more particularly to a chuck adapted to receive a bit therein relatively easily prior to the operation of the drill, and thereafter to afford self-tightening action dependent upon the speed of rotation of the drill so that the bit may be readily removed upon completion of a drilling operation.

Heretofore, various so-called self-tightening chucks have been available, but these have either required excessive manual manipulation or else have not been sensitively responsive to the amount of grip on the bit required, and have required also a complex mechanism involving exceptionally close manufacturing tolerances and excessive expense in manufacture and repairs.

Accordingly, it is an object of the present invention to provide a cam chuck for drills, in which rotation of a driven cam chuck plunger is effective to create displacement of a plurality of balls in a cam plate, whereby to cam or drive the plunger and tapered sleeve towards each other and thereby squeeze or cam the chuck jaws inwardly into tighter engagement with the bit.

Another object of the invention is to provide a cam chuck as described, wherein rotation of a driven plunger serves to create a desirably tight lock between a cam chuck body and chuck sleeve threadedly secured thereto, and the plunger in order that the chuck sleeve may rotate with the plunger and impart rotary motion to the bit.

Other objects and advantages of the invention will become apparent as the description proceeds in accordance with the drawings, in which:

Figure 1 is a side elevational view, partly in vertical section, showing the cam chuck of the invention;

Figure 2 is a top plan view taken through the lines 2—2 of Figure 1, showing a cam plate and associated ball bearings for use in a chuck of the invention;

Figure 3 is a horizontal sectional view taken through the lines 3—3 of Figure 1, and showing means for insuring a desirably tight gripping relationship between the respective elements of the chuck; and Figure 4 is a horizontal sectional view taken through the lines 4—4 of Figure 1, disclosing a top plan of the coacting cam chuck sleeve and cam chuck jaws of the invention.

Referring now to Figure 1, the cam chuck 10 of the invention comprises a cam chuck plunger 12 having a stem portion 14 defining a threaded axial bore for receiving motive power from a suitable prime mover (not shown), a relatively enlarged cylindrical portion 16, and a lower backing drum or member 18, a cam chuck body 20 journaled on the upper portion 14 of the plunger 12 concentrically therewith, a cam chuck sleeve 22 threadedly secured to the cam chuck body 20, and a cam plate 24 defining a plurality of helical cam grooves or surfaces 26 carrying ball bearings 28 as positioned by a cam chuck ball retainer 30.

The cam chuck body 20 has an annular grip portion 32 which is knurled for easy manual adjustment, and defines a relatively enlarged bore 34 axially thereof for receiving the cam chuck ball retainer 30 and the cam plate 24, respectively, as journaled on the plunger 12, at its upper portion 14. The intermediate portion 16 of the plunger 12 is dimensioned to approximate the bore 34 in diameter, and defines a peripheral retainer recess 36 preferably extending a substantially 90° arc in the intermediate portion 16, and having abutment edges 38 and 40, respectively. These abutment edges serve to insure a desirable gripping relationship between the plunger 12 and the threadedly engaged cam chuck body 20 and cam chuck sleeve 22, respectively, by means of a cam chuck retainer pin 42 held in an arcuate vertical groove 44 in the cam chuck body 20 as hereinafter further described.

The lower portion of the cam chuck sleeve 22 defines a substantially frusto-conical bore 46 adapted to coact in camming relationship with a plurality of jaws 48, the jaws 48 being preferably joined by resilient elements 50 adjacent their upper ends. The jaws 48 have their upper ends substantially flat for abutting engagement with the backing element 18 of the plunger 12; and accordingly, on downward movement of the plunger 18, move radially inwardly so that the inner vertical edges 52 thereof may grip a drill or the like 54 with secure clamping action, as further assured by a suitable configuration for the inner edges 52 of the jaws 48. In order to prevent the cam chuck retainer pin 42 from downward movement into the cavity defined by the teeth 48 and the cam chuck sleeve 22, cam chuck plunger retainer 56 is disposed in an annular groove 58, this retainer being preferably formed of hardened spring.

The helical cam grooves 26 are preferably disposed at equal intervals of the cam plate 24, and are formed with a uniform rise of approximately 6% from the horizontal. A plurality of apertures 60 are formed in the cam chuck ball retainer 30, and are disposed circumferentially at equally spaced distances to retain the balls 28 for equally guided movement in their helical grooves 26.

These grooves have a right hand helical lead in which the shallow or high portion trails when the drill 54 is driven with a right hand turn. Thus the cam rise faces in the direction of rotation of the plunger 12 during its normal operation. The balls rest in the cam grooves and carry the weight of the chuck body 20. Thus the balls are in bearing contact with both the body 20 and plate 24 at all times when the plunger 66 is upright regardless of whether it is caused by weight or a preliminary hand tightening of the sleeve 22. The frictional bearing relationship of the balls to the surfaces 68 and 26 causes the balls to roll up or down the inclined grooves 26 whenever the chuck body 20 is rotated relative to the plunger 66 depending upon the relative direction of rotation. Although this relative rotation is limited by the pin 42 engaging the stop 38 in one direction or the stop 40 in the other, nevertheless, sufficient movement is provided to assure tightening of the chuck by the balls.

At the start in using the chuck the body 20 is rotated relative to the plunger in the direction opposite to that indicated by the arrow 70 to locate the balls at the deepest part of the cam grooves and the sleeve 22 is also loosened enough to receive the drill 54. Thereafter the tool shank is inserted into the jaws 48. After insertion, the tool shank 54 may be initially gripped by tightening the sleeve 22 with respect to the body 20 by which the internally threaded portion 62 of the sleeve 22 and the externally threaded portions 64 of the cam chuck body 20, which are right hand threaded to afford relatively free turning movement of the sleeve 22 on the cam chuck body 20, operate to lift the frusto-conical camming surface 46 to bear against the jaws, and drive them inwardly to grip the tool shank.

Thereafter, when the spindle 66 is rotated to drive the drill 54 in the direction opposite to that indicated by the arrow 70, the cam chuck plate 24 turns with it while the body or collar 20 lags behind due to momentary manual retardation or to the work load on the drill that is transmitted thereto through the jaws 48 and sleeve 22. The balls 28 being in contact with the body 20 and cam grooves 26 for reasons already mentioned, the balls under this lagging relative movement will roll upwardly or towards the shallow part of the cams and raise the chuck body and thereby the frusto-conical camming surface 46 of the chuck body to further tighten the jaws against the tool shank.

Positioning the pin 42 at the stop 40 when this manual tightening is begun will permit the maximum possible rotation of the chuck body relative to the plunger, thus carrying the sleeve 22 axially upward relative to the backing member 18 in the cam chuck body as far as possible and gaining thereby the full tightening potential of the jaws.

Since the balls are accurately spaced by the ball retainer 30, as the cam chuck body is rotated relative to the plunger in the tightening direction, each ball functions in its respective inclined groove 26 with equal force.

Thereafter, torque load on the tool results in a rotational force applied to the cam chuck body to rotate it relative to the plunger in the tightening direction, thus further wedging the balls between the inclined groove surfaces and the upper cam chuck bearing surface in relation to the load carried by the plunger 66. Thus, the greater the torque load applied by the tool, the tighter the jaws will grip the tool shank.

For the release of the drill, if the body 20 is held stationary and the spindle 66 turned in a reverse direction indicated by the arrow 70, the balls roll down the cam faces and release the jaws, without the need for a special tool or adjustment of parts, and the simplicity of the construction is such that no extra strain will be placed on any of the camming elements, although the operation is sure and uniform throughout long periods of use.

Although I have herein set forth and described my invention with respect to certain specific principles and details thereof, it will be obvious to those skilled in the art that these may be varied without departing from the spirit and scope of the invention as set forth in the hereunto appended claims.

I claim:

1. In a chuck, the combination of a cam chuck body, a cam chuck sleeve threadedly secured on said cam chuck body, a plunger axially disposed in said cam chuck body and cam chuck sleeve, said cam chuck body defining a bore having an enlarged lower portion and reduced upper portion receiving an upper end of said plunger therethrough for rotation by suitable rotary motive means, a plurality of jaws disposed in said cam chuck sleeve, said cam chuck sleeve having a substantially frusto-conical lower end portion adapted to receive said jaws in complementary relationship, said plunger having a lower end adapted to seat against the upper ends of said jaws, a plurality of circumferentially spaced, horizontally aligned helical cam surfaces at the upper end of said plunger, a plurality of balls adapted to be received in said cam surfaces, and retainer means for evenly spacing and caging said balls, said balls being adapted to ride upwardly in said cam surfaces when said cam chuck body is rotated relative to said helical cam surfaces in the direction of the rise of said helical cam surfaces to cam said cam chuck sleeve upwardly against said jaws and thereby cam said jaws radially inwardly by said conical portion of said cam chuck sleeve to effect tight gripping relationship with a drill which may be received therein.

2. In a chuck, the combination of a cam chuck body, a cam chuck sleeve threadedly secured on said cam chuck body, a plunger axially disposed in said cam chuck body and cam chuck sleeve, said cam chuck body defining a bore having an enlarged lower portion and reduced upper portion receiving an upper end of said plunger therethrough for rotation by suitable rotary motive means, a plurality of jaws disposed in said cam chuck sleeve, said cam chuck sleeve having a substantially frusto-conical lower end portion adapted to receive said jaws in complementary relationship, said plunger having a lower end adapted to seat against the upper ends of said jaws, a plurality of circumferentially spaced, horizontally aligned helical cam surfaces at the upper end of said plunger, a plurality of balls adapted to be received in said cam surfaces, and retainer means for evenly spacing and caging said balls, said balls being adapted to ride upwardly in said cam surfaces when said cam chuck body is rotated relative to said helical cam surfaces in the direction of the rise of said helical cam surfaces to cam said cam chuck sleeve upwardly against said jaws and thereby cam said jaws radially inwardly by said conical portion of said cam chuck sleeve to effect tight gripping relationship with a drill which may be received therein, said plunger defining an axially extending groove and said cam chuck body carrying pin means adapted to be received in said groove and to engage the vertical side edge of said cam groove to afford relative axial movement of said cam chuck body and said cam chuck sleeve.

3. In a chuck, the combination of a cam chuck body, a cam chuck sleeve threadedly secured on said cam chuck body, a plunger axially disposed in said cam chuck body and cam chuck sleeve, said cam chuck body defining a bore having an enlarged lower portion and reduced upper portion receiving an upper end of said plunger therethrough for rotation by suitable rotary motive means, a plurality of jaws disposed in said cam chuck sleeve, said cam chuck sleeve having a substantially frusto-conical lower end portion adapted to receive said jaws in complementary relationship, said plunger having a lower end adapted to seat against the upper ends of said jaws, an annular cam plate defining therein a plurality of circumferentially spaced, horizontally aligned helical cam surfaces on its upper face, a plurality of balls adapted to be received in said cam surfaces, and retainer means for evenly spacing and caging said balls, said balls being adapted to ride upwardly in said cam surfaces when said cam chuck body is rotated relative to said helical cam surfaces in the direction of rise of said helical cam surfaces to cam said jaws radially inwardly by said conical portion of said cam chuck sleeve to effect tight gripping relationship with a drill which may be received therein.

4. In a chuck, the combination of a cam chuck body, a cam chuck sleeve threadedly secured on said cam chuck body, a plunger axially disposed in said cam chuck body and cam chuck sleeve, said cam chuck body defining a bore having an enlarged lower portion and reduced upper portion receiving an upper end of said plunger therethrough for rotation by suitable rotary motive means, a plurality of jaws disposed in said cam chuck sleeve, said cam chuck sleeve having a tapering lower end portion adapted to receive said jaws in complementary relationship, said plunger having a lower end adapted to seat against the upper ends of said jaws, an annular cam plate defining therein a plurality of circumferentially spaced, horizontally aligned axially facing helical cam surfaces on its upper face, said plunger defining a relatively enlarged portion adapted to be slidably received in said enlarged portion of said bore, said cam plate being seated on the enlarged portion of said plunger, a plurality of balls adapted to be received in said cam surfaces, and retainer means for evenly spacing and caging said balls, said balls being adapted to ride upwardly in said cam surfaces concurrently when said ball-retainer means is moved by one of them when said cam chuck body is rotated relative to said helical cam surfaces in the direction of the axial rise of said helical cam surfaces to cam said cam chuck sleeve upwardly against said jaws and thereby cam said jaws radially inwardly by said tapering portion of said cam chuck sleeve to effect tight gripping relationship with a drill which may be received therein.

5. In a chuck, the combination of a cam chuck body, a cam chuck sleeve threadedly secured on said cam chuck body, a plunger axially disposed in said cam chuck body and cam chuck sleeve, said cam chuck body defining a bore having an enlarged lower portion and reduced upper portion receiving an upper end of said plunger therethrough for rotation by suitable rotary motive means, a plurality of jaws disposed in said cam chuck sleeve, said cam chuck sleeve having a substantially frusto-conical lower end portion adapted to receive said jaws in complementary relationship, said plunger having a lower end adapted to seat against the upper ends of said jaws, an annular cam plate defining therein a plurality of radially spaced, horizontally aligned helical cam surfaces on its upper face, said plunger defining a relatively enlarged portion adapted to be slidably received in said enlarged portion of said bore, said cam plate being seated on the enlarged portion of said plunger, a plurality of balls adapted to be received in said cam surfaces, and a cam chuck ball retainer ring defining a plurality of apertures riding on said balls with said apertures in registration with said balls, said balls being adapted to ride upwardly in said cam surfaces when said cam chuck body is rotated relative to said helical cam surfaces in the direction of rise of said helical cam surfaces to cam said cam chuck sleeve upwardly against said jaws and thereby cam said jaws inwardly by said conical portion of said cam chuck sleeve to effect tight gripping relationship with a drill which may be received therein.

6. In a chuck, the combination of a cam chuck body, a cam chuck sleeve threadedly secured on said cam chuck body, a plunger axially disposed in said cam chuck body and cam chuck sleeve, said cam chuck body defining a bore having an enlarged lower portion and reduced upper portion receiving an upper end of said plunger therethrough for rotation by suitable rotary motive means, a plurality of jaws disposed in said cam chuck sleeve, said cam chuck sleeve having a substantially conical lower end portion adapted to receive said jaws in complementary relationship, said plunger having a lower end adapted to seat against the upper ends of said jaws, an annular cam plate defining therein a plurality of spaced, horizontally aligned helical cam surfaces on its upper face, said plunger defining a relatively enlarged portion adapted to be slidably received in said enlarged portion of said bore, said cam plate being seated on the enlarged portion of said plunger, a plurality of balls adapted to be received in said cam surfaces, and a cam chuck ball retainer ring defining a plurality of apertures riding on said balls with said apertures in registration with said balls, said balls being adapted to ride upwardly in said cam surfaces when said cam chuck body is rotated relative to said helical cam surfaces in the direction of rise of said helical cam surfaces, whereby to cam said cam chuck sleeve upwardly against said jaws and thereby cam said jaws inwardly by said conical portion of said cam chuck sleeve to effect tight gripping relationship with a drill which may be received therein, said plunger defining an axially extending groove and said cam chuck body carrying pin means adapted to be received in the said groove and to engage the vertical side edges of said groove to afford relative axial movement of said cam chuck body and said cam chuck sleeve.

7. In a chuck, the combination of a cam chuck body, a cam chuck sleeve threadedly secured on said cam chuck body, a plunger axially disposed in said cam chuck body and cam chuck sleeve, said cam chuck body defining a bore having an enlarged lower portion and reduced upper portion receiving an upper end of said plunger therethrough for rotation by suitable rotary motive means, a plurality of jaws disposed in said cam chuck sleeve, said cam chuck sleeve having a substantially conical lower end portion adapted to receive said jaws in complementary relationship, said plunger having a lower end adapted to seat against the upper ends of said jaws, a plurality of spaced, horizontally aligned helical cam surfaces at the upper end of said plunger, a plurality of balls adapted to be received in said cam surfaces, and retainer means for spacing and caging said balls, said balls being adapted to ride upwardly in said cam surfaces when said cam chuck body is rotated relative to said helical cam surfaces in the direction of rise of said helical cam surfaces, whereby to cam said chuck sleeve upwardly against said jaws and thereby cam said jaws radially inwardly on said conical portion of said cam chuck sleeve to effect tight gripping relationship with a drill which may be received therein, said jaws having a segmental horizontal configuration and having the adjacent sides thereof biased outwardly of each other by resilient connecting means disposed therebetween whereby said jaws outwardly urged the conical portion of said cam chuck sleeve downwardly to urge said plunger and cam chuck body to engage said balls.

References Cited in the file of this patent

UNITED STATES PATENTS

| 1,251,558 | Morrow | Jan. 1, 1918 |
| 1,775,994 | Emrick | Sept. 16, 1930 |
| 2,612,377 | Edens | Sept. 30, 1952 |
| 2,777,703 | Picket et al. | Jan. 15, 1957 |

FOREIGN PATENTS

| 681,717 | France | May 19, 1930 |
| 589,168 | Great Britain | June 12, 1947 |
| 616,070 | Great Britain | Jan. 17, 1949 |
| 651,556 | Great Britain | Apr. 4, 1951 |